Nov. 10, 1964     M. L. ANTHONY     3,156,133
BALL BEARING LEAD SCREW FOLLOWER

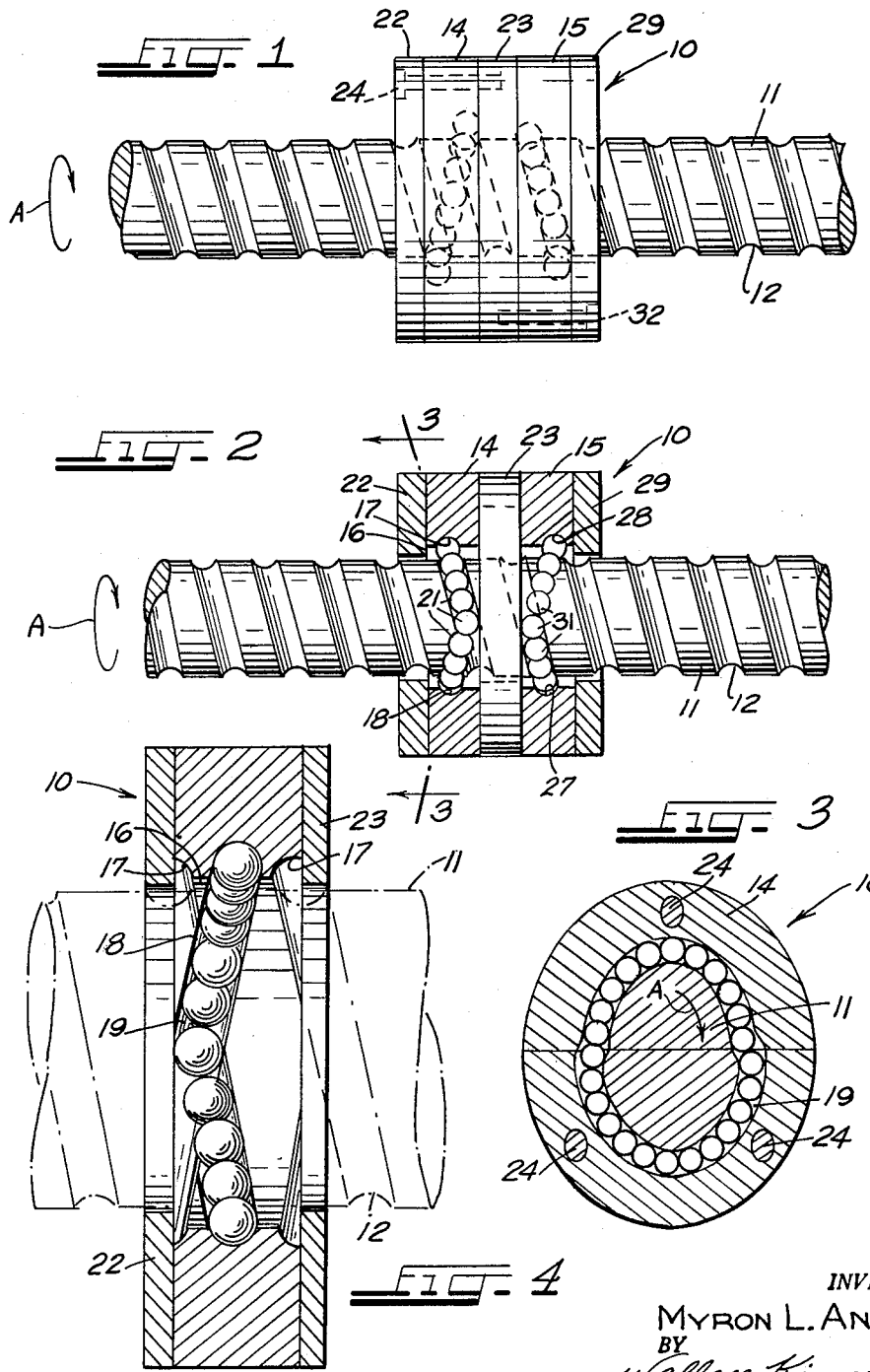

Filed June 21, 1962     2 Sheets-Sheet 2

INVENTOR.
MYRON L. ANTHONY
BY
Wallace, Kinzer & Korn
Attys.

United States Patent Office 3,156,133
Patented Nov. 10, 1964

3,156,133
BALL BEARING LEAD SCREW FOLLOWER
Myron L. Anthony, 6040 Brainard, La Grange, Ill.
Filed June 21, 1962, Ser. No. 204,207
6 Claims. (Cl. 74—459)

This invention relates to a new and improved ball bearing follower for a lead screw, suitable for use in machine tools and similar applications.

It is frequently desirable to utilize a ball bearing construction in connection with a lead screw utilized in a machine tool or like application. The ball bearing construction is especially desirable where relatively heavy loads must be carried by the follower without substantially detracting from the precision of operation of the lead screw. Follower devices utilized in lead screws of this kind, as heretofore known, usually constitute a main ball race member having a helical groove that is complementary to a helical ball-receiving thread-like recess in the lead screw. The helical channel in the race member may comprise several turns of the helix. The opposite ends of the helical channel in the race member are connected to a return channel to afford a complete closed path for the ball bearings of the device. Lifting elements of one form or another are provided, at the ends of the main helical channel, to deflect individual balls and divert them into the return channel. Usually, these deflecting devices comprise spring fingers or similar members which may be subject to fatigue failure and which may cause jamming of the ball members in operation of the device. Another substantial problem in connection with ball screw followers of this general kind is that they tend to have an abrupt, irregular movement caused by the rapid changes in direction of movement and velocity of the ball members at the point of transition from the main bearing channel to the return path.

It is a principal object of the present invention, therefore, to provide a new and improved follower for a ball-type lead screw which is smooth and accurate in operation and which is effective to overcome or minimize the aforementioned difficulties encountered in devices of this kind.

A particular object of the invention is to eliminate abrupt changes in the direction and velocity of ball movement in a follower for a ball-type lead screw.

Another object of the invention is to eliminate the necessity for lifting fingers or similar movable members to transfer ball bearings from a main bearing channel to a return channel in a follower for a lead screw of the ball bearing kind.

Another object of the invention is to eliminate or minimize backlash in a ball bearing lead screw follower construction.

Another object of the invention is to provide a new and improved ball bearing lead screw follower construction which permits the fabrication of followers capable of handling a range of load requirements by utilizing a plurality of individual standardized units.

A corollary object of the invention is to provide a new and improved construction for a ball bearing lead screw follower that is simple and economical in construction, yet smooth and accurate in operation.

Accordingly, the present invention is directed to a follower for a lead screw of the ball bearing type having a helical ball-receiving recess of given pitch and direction. The follower comprises a ball race member having an axial aperture slightly larger in diameter than the external diameter of the lead screw, this ball race member being disposed in encompassing relation to the lead screw. The ball race member is provided with first and second oppositely-directed helical internal ball-receiving channels. The first channel is parallel to the helical recess in the lead screw. Moreover, the channels intersect at their ends to afford a complete single-turn ball path around the lead screw, the first channel comprising a bearing portion of that path and the second channel defining a return portion of the path. A plurality of load bearing ball members are disposed in the aforementioned channels in the ball race member, substantially completely filling the ball path. A pair of deflectors, preferably of rigid construction, are located at the respective intersections of the channels. These deflectors extend radially of the axis of the lead screw, in fixed positions relative to the ball race member, and are effective to deflect the balls from one channel to the other of the ball race member during operation of the follower.

Other and further objects of the present invention will be apparent from the following description and claims and are illustrated in the accompanying drawings which, by way of illustration, show preferred embodiments of the present invention and the principles thereof and what is now considered to be the best mode contemplated for applying these principles. Other embodiments of the invention embodying the same or equivalent principles may be used and structural changes may be made as desired by those skilled in the art without departing from the present invention and the purview of the appended claims.

In the drawings:

FIG. 1 is an elevation view of a ball bearing lead screw follower, and lead screw, constructed in accordance with one embodiment of the present invention;

FIG. 2 is a longitudinal sectional view of the follower construction illustrated in FIG. 1 but with the follower rotated 90° from the position of FIG. 1;

FIG. 3 is a sectional view taken approximately along the lines 3—3 in FIG. 2;

FIG. 4 is a longitudinal sectional view of a part of the follower of FIGS. 1–3, showing the internal configuration of one ball race member;

Figure 5:
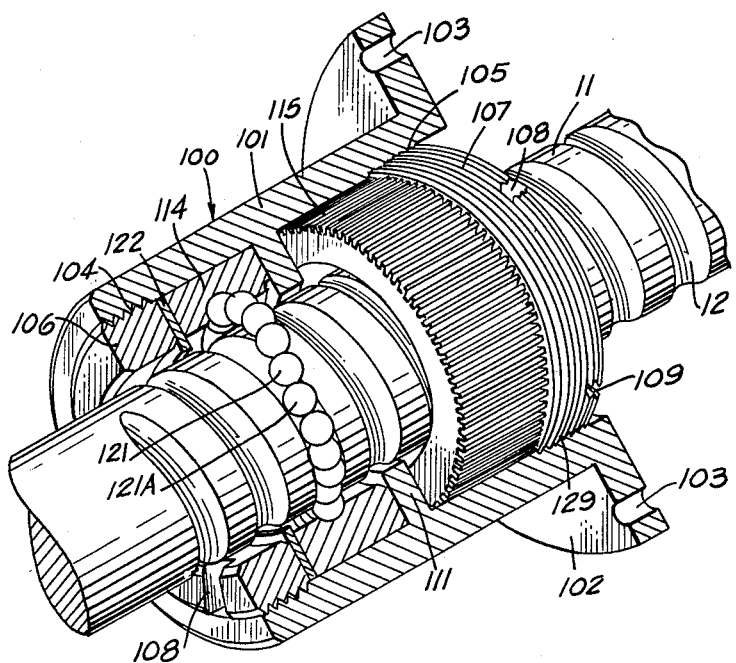
FIG. 5 is a perspective view of another embodiment of the present invention.

FIGS. 1–4 illustrate a ball bearing lead screw follower generally designated by the reference character 10, the follower 10 being constructed in accordance with and illustrating the basic principles of the present invention. The follower 10 is utilized in conjunction with a lead screw 11 of substantially conventional construction. Thus, the lead screw 11 is of constant external diameter and is provided with a helical ball-receiving recess 12 of given pitch and direction.

The follower 10 comprises a pair of ball race members 14 and 15 which are substantially similar in construction to each other. The ball race member 14 is of cylindrical construction, having an axial aperture 16 that is larger in diameter than the external diameter of the lead screw 11 (see FIGS. 2 and 4). The race member 14 is provided with a first internal helical ball-receiving channel 17 that extends parallel to the ball-receiving recess 12 in the lead screw 11. The ball race member 14 also has a second helical internal ball-receiving channel 18. The channel 18 is substantially deeper than the channel 17; moreover, it extends in the opposite direction. That is, the helical path of the second channel 18 is a reverse or return path as compared with the first channel 17 and the thread 12 of the lead screw. The ends of the channels 17 and 18 intersect to afford a complete single-turn ball path, around the lead screw 11, within the confines of the ball race 14. In this ball path, generally designated by the reference character 19 in FIG. 3, which shows the complete path, there is a bearing portion defined by the first channel 17 in the ball race member 14 and a return portion that is defined by the second channel 18 in the ball race member.

In the illustrated construction, the axial length of the ball race member 14 is made equal to the center-to-center spacing between individual turns of the helical recess 12 in the lead screw 11. The pitch of the first channel 17 in the ball race member 14 is, as noted above, equal to the pitch of the lead screw recess 12. Moreover, the pitch of the return channel 18 is made approximately the same as that of the channel 17, although the inclination of the second channel is opposite that of the first channel as noted hereinbefore. Consequently, the effective length of each of the channel 17 and 18 is approximately 180°. Throughout this specification, and in the appended claims, the lengths of the channels in the ball race members are intended to refer to the effective full-width lengths of the channels, and not to any partial extensions thereof that could not accept a ball member, despite the fact that such extensions may be permitted in order to simplify manufacturing techniques as discussed more fully hereinafter.

A plurality of load bearing balls 21 are disposed within the ball path 19 defined by the full-width portions of the channels or tracks 17 and 18. Of course, some means must be provided for preventing loss of the balls 21 from the required closed path 19. This means is provided by a pair of deflectors 22 and 23 of angular construction secured to the opposite sides of the ball race member 14. The deflectors 22 and 23 are relatively rigid washer-like members that close the path 19. Furthermore, the deflectors 22 and 23 are effective to deflect the balls between the channels 17 and 18 at the two intersections between the two channels. The deflectors 22 and 23 are mounted in fixed position relative to the ball race member 14, by suitable mounting means, to afford a unitary assembly. In the construction shown in FIGS. 1-4, the mounting means comprises a series of mounting screws 24 that extend from the deflectors 22 through the ball race member 14 and into the deflector 23.

The ball race member 15 of the follower 10 is substantially similar to the construction of the ball race 14. Thus, member 15 comprises a first internal helical ball-receiving channel 27 that extends parallel to the helical ball-receiving recess 12 in the lead screw 11. The race member 15 further includes a second and deeper return channel 28, the two channels 27 and 28 defining a single-turn ball path. At one intersection of the channels 27 and 28, the path is closed by the center deflector 23. The other side of the ball path defined by the channels 27 and 28 is closed by another annular deflector member 29 that is secured to the central deflector 23 by suitable mounting means such as a series of screws 32 extending from the deflector 29 through the ball race member 15 and into the central deflector 23. Thus, the ball race members 14 and 15 and the deflector members 22, 23 and 29 are mounted together in a unitary assembly by means of the screws 24 and 32. Furthermore, the construction of the follower 10 is such that the bearing channels 17 and 27 of the two ball race members 14 and 15 are displaced 180° with respect to each other. Thus, the bearing portions of the two ball paths of the follower 10 are distributed in balanced relation about the axis of the lead screw 11.

In operation, the lead screw 11 is rotated in the usual manner to drive the follower 10 axially of the lead screw, the follower being held against rotation by suitable means (not shown). Assuming that the lead screw 11 is rotated in the direction indicated by the arrows A in FIGS. 1-3, this being clockwise rotation in the sectional view of FIG. 3, the follower 10 is moved to the right as seen in FIGS. 1 and 2. As the lead screw 11 rotates, the balls 21 within the race member 14 are driven around the lead screw in the direction of the arrow A. Each time one of the balls comes to the end of the track 18 adjacent the center deflector 23, the ball drops into the helical recess 22 in the lead screw and continues its movement along the bearing channel 17 in the race member 14. At the opposite side of the lead screw from that seen in FIG. 2, the balls are deflected, by the deflector 22, from the channel 17 into the return channel 18.

A corresponding action takes place within the race member 15 at the right-hand side of the follower 10 as seen in FIG. 2. Thus, the balls 31 advance along the bearing channel 27 in the race member 15 until they engage the right-hand surface of deflector 23. The continued upward movement of the balls 31 results in their being deflected to the right and slightly upwardly into the return channel 28. They follow the channel 28 around to its end, in conjunction with the deflector 29 at the opposite side of the lead screw 11, where the balls again drop into the bearing channel 27.

The ball bearing follower 10 affords a smooth and precise operation, despite the obvious simplicity of its construction. As shown in FIG. 3, the path followed by the balls is substantially elliptical in configuration. There are just two points of transition in direction and velocity, in the movement of the individual balls, and the change in direction and velocity is quite small as compared with conventional devices. There are no flexible or movable lifting devices or fingers, of the kind used in most ball screw followers, thereby eliminating a major source of jamming difficulty.

Fabrication of the ball race members 14 and 15 is a rather simple operation as compared with previously known devices. Each of these members is formed as a cylinder with reversed internal channels cut or otherwise formed therein by conventional techniques. In fact, the ball race members can be fabricated by machining or molding internal helical recesses in an elongated cylindrical member, after which the desired lengths for the individual ball race members can be cut therefrom to afford a series of standardized ball races of the required size and configuration. There is no need to form a separate return path, other than the second helical thread comprising channels 18 and 28 in the members 14 and 15 respectively. To provide for substantially larger load requirements than could be sustained by the dual-race construction of FIGS. 1-4, it is only necessary to add further race members and deflectors until the resulting ball bearing structure is capable of withstanding the required load. The deflectors 22, 23 and 29 are simple rings, and consequently can be fabricated quite economically.

It should be noted that the internal diameter of each of the deflectors must be small enough so that the deflectors engage the individual balls radially inwardly of their centers at the track intersections where the balls come in contact with the deflectors. It is for this reason that the internal bore of each of the deflectors is made somewhat smaller than the internal diameter of the race members 14 and 15. If this is not done, and the deflectors engage only the upper portions of the balls, the deflectors may tend to jam the balls at the track intersections. Of course, this requires that the helical recess 12 in the lead screw 11 be of slightly less than hemispherical depth with respect to the balls 21 and 31; this is the usual practice with respect to ball screws and does not present a difficult requirement in the fabrication of the lead screw.

Figure 6:
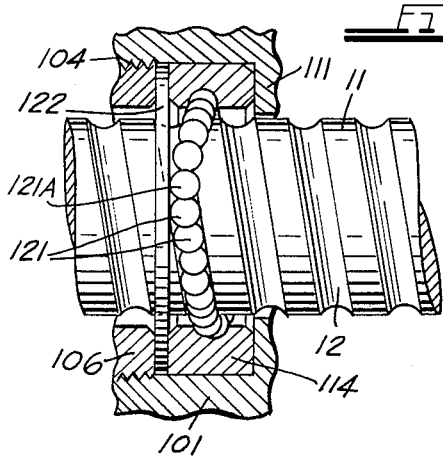
FIG. 6 is a sectional view of a part of the construction shown in FIG. 5.

FIGS. 5 and 6 illustrate a slightly modified form of the present invention comprising a follower 100 mounted upon a ball-type lead screw 11. As before, the lead screw 11 is provided with a helical recess 12. Moreover, the recess 12 is made slightly less than hemispherical depth with respect to the balls to be employed in the device.

The follower 100 comprises a cylindrical external housing 101 having a mounting flange 102 at one end thereof. The mounting flange 102 may be provided with a series of apertures 103 to permit mounting of the housing 101 on a toolholder, workholder, or other machine tool component. The ends 104 and 105 of the housing 101 are provided with internal threads for receiving a pair of retaining rings 106 and 107 respectively. The ring 106 is provided with a plurality of slots 108 and a similar set of slots 109 is provided in the retaining ring 107 to permit tightening of the retaining rings in the threaded portions 104 and 105 of the housing. The central portion of the housing 101 comprises an inwardly extending rib or flange 111 that is utilized as one of the deflectors in the follower 100, as explained more fully hereinafter.

The follower 100 includes two ball race members 114 and 115 that are similar in construction to the race members 14 and 15 in the previously described embodiment. The internal construction of the ball race members is the same as described hereinabove. In this instance, however, the periphery of each of the ball race members is of splined construction, and an internal spline structure is used in the housing 101 so that the housing is effective to hold the two race members against rotation relative to the housing. A first deflector member 122 is located between the retaining ring 106 and the first ball race member 114. A second deflector member 129 is located between the retaining ring 107 and the ball race member 115.

The basic operation of the ball screw follower 100 is essentially the same as that described above with respect to the follower construction 10. Thus, the individual ball bearings 121 that fill the ball path within the race member 114 are deflected between the bearing and return channels in the ball race member by the engagement of the balls with the central deflector rib 111 of the housing 101 and the washer-like deflector 122. In FIGS. 5 and 6, the balls identified by the reference character 121A are located at the precise point of deflection from the bearing portion of the ball path to the return portion thereof. A corresponding construction is, of course, utilized in the mating race member 115.

The principal advantage of the construction shown in FIGS. 5 and 6 over that of FIGS. 1-4 is that it facilitates uniform axial pre-loading of the ball bearing follower structure 100. Thus, in assembling the follower 100, the first ball race 114 may be inserted in the follower, axially, until it engages the center deflector rib 111. The balls 121 are then loaded into the ball track in the race member 114, after which the deflector 122 is positioned in the follower and the retaining ring 106 is threaded into the housing 101 to hold the left-hand portion of the follower in assembled condition. The same procedure is then followed with respect to the ball race member 115 and the balls contained therein, the deflector 129 and the retaining ring 107. The retaining rings 106 and 107 can then be tightened to pre-load the bearings to a slight extent and thereby eliminate or at least minimize backlash in operation of the follower 100. Otherwise, the device 100 is substantially similar to the device 10 of FIGS. 1-4.

In each of the above-described embodiments, the bearing and return channels for each complete 360° ball path are shown as being approximately 180° in length. This is the preferred condition, and affords the smoothest operation because the ball track is approximately elliptical and the balls move at equal velocities in the bearing and return channels. Further, the illustrated construction provides for a minimum change in velocity at the track intersections. The lengths of the two channels, however, can be varied to some extent without losing all of the advantages of the invention; in particular, the pitch of the return channel may be made somewhat greater than that of the bearing channel without incurring excessive velocity changes and resultant irregularity of operation, particularly in relatively large ball screws. By the same token, the deflector surfaces need not be precisely perpendicular to the ball screw axis, but may be inclined to a limited degree. The deflectors need not be annular elements, as described; rather, relatively small inserts affording the desired radial end-walls for the ball channels, at their intersections, may be employed.

Hence, while preferred embodiments of the invention have been illustrated and described, it is to be understood that they are capable of variation and modification, and I therefore do not wish to be limited to the precise details set forth, but desire to avail myself of such changes and alterations as fall within the purview of the following claims.

I claim:

1. A follower for a ball-type lead screw of predetermined diameter having a helical ball-receiving recess of given path and direction, comprising:
    a one-piece cylindrical ball race member having an axial aperture of greater diameter than the diameter of said lead screw, disposed in encompassing relation to said lead screw,
    said ball race member having a first internal helical ball-receiving channel of given depth extending parallel to the helical recess in said lead screw, and a second internal helical channel of greater depth but oppositely directed, relative to said first channel, each of said channels extending for the full axial length of said ball race member, said channels intersecting at their ends to afford a complete one-turn ball path, around said lead screw, comprising an advance portion defined by said first channel and a return portion defined by said second channel;
    a plurality of load-bearing ball members disposed in said channels and substantially completely filling said ball path;
    and a pair of deflectors, mounted on said ball race member at the opposite ends thereof at the outer side of the respective intersections of said channels and extending substantially radially of the axis of said lead screw, for deflecting said balls from one channel to the other, said deflectors each affording a substantially uninterrupted transition surface consisting a continuation of both channels at their intersection.

2. A follower for a ball-type lead screw of predetermined diameter having a helical ball-receiving recess of given pitch and direction, comprising:
    a plurality of one-piece cylindrical ball race members each having an axial aperture of greater diameter than the external diameter of said lead screw, disposed in encompassing relation to said lead screw,
    said ball race members each having first and second oppositely-directed internal helical ball-receiving channels therein, the first channel extending parallel to the helical recess in said lead screw, said second channel being substantially deeper than said first channel and said channels intersecting at their ends to afford a complete one-turn ball path around said lead screw within each race member, each such path comprising an advance portion defined by said first channel and a return portion defined by said second channel thereof;
    a plurality of load-bearing ball members disposed in said channels and substantially completely filling each of said ball paths;
    a series of rigid planar surfaced deflectors, one such deflector being located at each of the respective intersections of said channels and extending substantially radially of the axis of said lead screw, for deflecting said balls from one channel to the other in each of said ball paths said deflectors each affording a substantially uninterrupted transistion surface constituting a continuation of both channels at the intersection;
    and mounting means for retaining all of said ball race members and deflectors in a unitary assembly with said advance portions of said ball paths distributed in balanced relation about the axis of said lead screw.

3. A follower for a ball-type lead screw of given diameter having a ball-receiving helical recess of given pitch and direction, comprising:
- a plurality of one-piece cylindrical ball race members each having an axial aperture of greater diameter than the external diameter of said lead screw, disposed in encompassing relation to said lead screw,
- said ball race members each having first and second oppositely-directed internal helical ball-receiving channels therein, the first channel extending parallel to the helical recess in said lead screw, said second channel being substantially deeper than said first channel and said channels intersecting at their ends to afford a complete one-turn ball path around said lead screw within each race member, each such path comprising a bearing portion defined by said first channel and a return portion defined by said second channel thereof;
- a plurality of load-bearing ball members disposed in said channels and substantially completely filling each of said ball paths;
- a series of rigid deflectors, one such deflector being located at each of the respective intersections of said channels, for deflecting said balls from one channel to the other in each of said ball paths, each deflector constituting a rigid planar-surfaced annular washer disposed in abutting relation to one end of one of said ball race members to afford a transition surface constituting a continuation of both channels at their intersection;
- and mounting means for retaining all of said ball race members and deflectors in a unitary assembly with said bearing portions of said ball paths distributed in balanced relation about the axis of said lead screw.

4. A follower for a ball-type lead screw of predetermined diameter having a helical ball-receiving recess of given pitch and direction, comprising;
- a pair of ball race members each having an axial aperture of greater diameter than the external diameter of said lead screw, disposed in encompassing relation to said lead screw,
- said ball race members each having first and second oppositely-directed internal helical ball-receiving channels therein, the first channel extending parallel to the helical recess in said lead screw, said second channel being substantially deeper than said first channel, and said channels intersecting at their ends to afford a complete one-turn ball path around said lead screw within each race member, each such path comprising a bearing portion defined by said first channel and a return portion defined by said second channel thereof;
- a plurality of load-bearing ball members disposed in said channels and substantially completely filling each of said ball paths;
- a series of deflectors, one such deflector being located at each of the respective intersections of said channels and extending substantially radially of the axis of said lead screw, for deflecting said balls from one channel to the other in each of said ball paths;
- mounting means for retaining all of said ball race members and deflectors in a unitary assembly with said bearing portions of said ball paths distributed in balanced relation about the axis of said lead screw;
- said mounting means including means for adjusting said deflectors relative to each other, axially of said lead screw to pre-load the ball bearings and assure smooth transitional movement of said balls from the bearing portions of said paths to the return portions thereof.

5. A follower for a ball-type lead screw of given diameter having a helical ball-receiving recess of given pitch and direction, comprising:
- a pair of one-piece cylindrical ball race members each having an axial aperture of greater diameter than the external diameter of said lead screw, disposed in encompassing relation to said lead screw,
- said ball race members each having first and second oppositely-directed internal helical ball-receiving channels of substantially equal pitch and each approximately 180° in length, the first channel extending parallel to the helical recess in said lead screw, said second channel being substantially deeper than said first channel, and said channels intersecting at their ends to afford a complete one-turn ball path around said lead screw within each race member, each such path comprising a bearing portion defined by said first channel and a return portion defined by said second channel thereof;
- a plurality of load-bearing ball members disposed in said channels and substantially completely filling each of said ball paths;
- a series of substantially rigid annular deflectors, one such deflector being located at each of the respective intersections of said channels and extending substantially radially of the axis of said lead screw, for deflecting said balls from one channel to the other in each of said ball paths said deflectors each affording a substantially uninterrupted transition surface constituting a continuation of both channels at the intersection;
- and mounting means for retaining all of said ball race members and deflectors in a unitary assembly with said advance portions of said ball paths distributed in balanced relation about the axis of said lead screw.

6. A follower for a ball-type lead screw of given diameter having a helical ball-receiving recess of given pitch and direction, comprising:
- a pair of ball race members each having an axial aperture of greater diameter than the external diameter of said lead screw, disposed in encompassing relation to said lead screw,
- said ball race members each having first and second oppositely-directed 180° internal helical ball-receiving channels therein, the first channel extending parallel to the helical recess in said lead screw, said second channel being substantially deeper than said first channel, and said channels intersecting at their ends to afford a complete one-turn ball path of generally elliptical configuration around said lead screw within each race member, each such path comprising a bearing portion defined by said first channel and a return portion defined by said second channel thereof, said bearing portions being displaced approximately 180° relative to each other;
- a plurality of load-bearing ball members disposed in said channels and substantially completely filling each of said ball paths;
- mounting means for retaining said ball race members in a unitary assembly;
- and three deflectors, carried by said mounting means, and extending radially of the axis of said lead screw at the intersections of said channels, the central deflector being common to both ball paths, for deflecting said balls from one channel to the other in each of said ball paths.

References Cited in the file of this patent

UNITED STATES PATENTS

| | | |
|---|---|---|
| 1,835,341 | Scharpenberg | Dec. 8, 1931 |
| 2,327,013 | Briggs | Aug. 17, 1943 |
| 2,468,506 | Millns | Apr. 26, 1949 |
| 2,924,113 | Orner | Feb. 9, 1960 |